United States Patent [19]

Trihey

[11] Patent Number: 4,750,452
[45] Date of Patent: Jun. 14, 1988

[54] WATER HEATER

[75] Inventor: John M. Trihey, Ringwood, Australia

[73] Assignee: Vulcan Australia Limited, Bayswater, Australia

[21] Appl. No.: 849,514

[22] PCT Filed: Aug. 7, 1985

[86] PCT No.: PCT/AU85/00187
§ 371 Date: May 7, 1986
§ 102(e) Date: May 7, 1986

[87] PCT Pub. No.: WO86/01282
PCT Pub. Date: Feb. 27, 1986

[30] Foreign Application Priority Data
Aug. 7, 1984 [AU] Australia .............................. PG6434
Apr. 12, 1985 [AU] Australia .............................. PG0016

[51] Int. Cl.⁴ ............................................ F22B 31/00
[52] U.S. Cl. ...................................... 122/24; 122/19; 122/161; 236/20 R; 236/21 R; 236/21 B; 431/1

[58] Field of Search ............... 122/161, 19, 24; 431/1; 236/20 R, 21; 126/351

[56] References Cited

U.S. PATENT DOCUMENTS

| | | | |
|---|---|---|---|
| 2,465,697 | 3/1949 | Peet | 236/21 X |
| 3,469,929 | 9/1969 | Haag | 431/1 |
| 4,241,723 | 12/1980 | Kitchen | 431/1 X |
| 4,465,025 | 8/1984 | Schroder | 122/161 X |
| 4,488,865 | 12/1984 | Davis | 431/1 |
| 4,501,261 | 2/1985 | Tsutsui et al. | 236/20 R X |

Primary Examiner—Edward G. Favors
Attorney, Agent, or Firm—Kenyon & Kenyon

[57] ABSTRACT

An instantaneous hot water heater having a coiled heat exchanger (4) through which water to be heated passes. A fuel supply assembly (22) is provided for supplying air and gas to the interior of the exchanger for combustion in such a way that combustion occurs as a series of rapidly occuring pulses at a rate of typically 50 to 100 ignitions per second. There is considerable turbulence in the combustion products whereby good heat exchange takes place enabling very efficient operation.

38 Claims, 10 Drawing Sheets

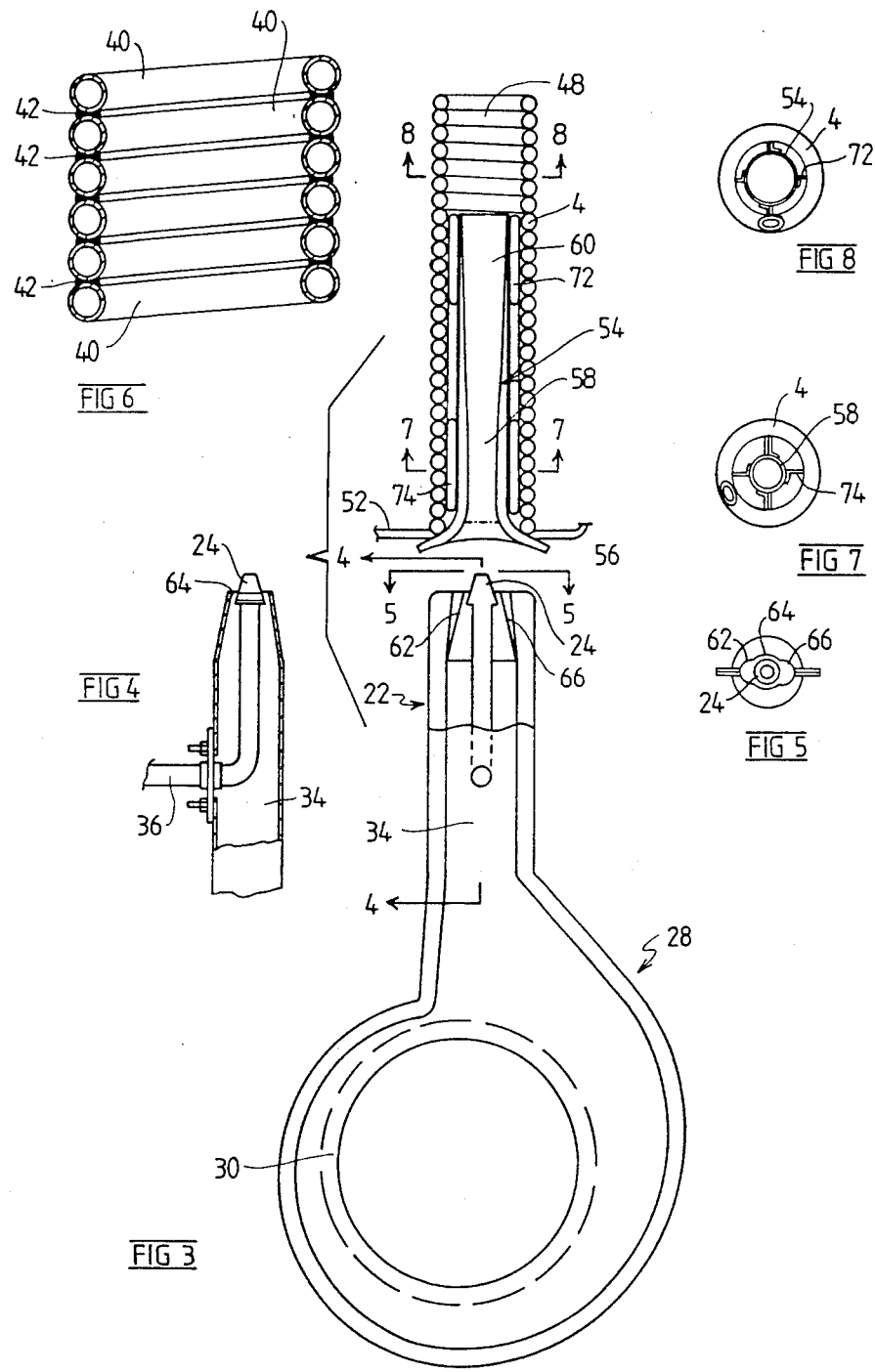

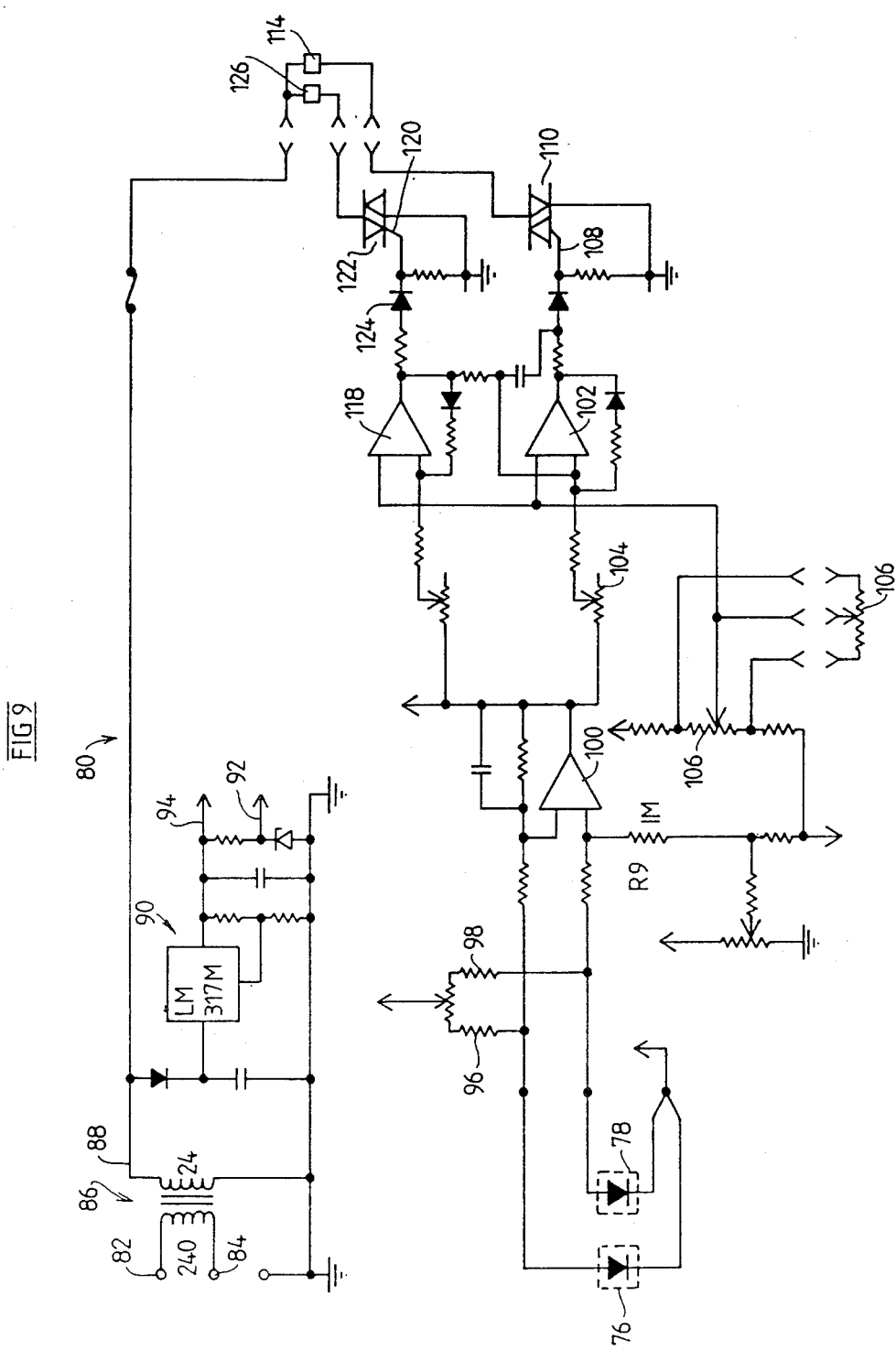

WATER HEATER

This invention relates to a water heater suitable for use in a domestic hot water supply.

More particularly, the invention relates to an "instantaneous" hot water heater, that is to say a heater of the type which does not have a storage reservoir for heated water but rather is provided with a relatively powerful burner system in order to heat water at a high rate, for instance of the order of say 20 liters per minute which is typical for a domestic hot water supply.

The object of the present invention is to provide a novel form of water heater which is compact and of relatively simple and inexpensive construction. A further object of the invention is to provide a new method of control for the heater.

According to the present invention there is provided a fuel fired water heater comprising a hollow elongated heat exchanger having a water conduit which has a cold water inlet and a hot water outlet, fuel supply means for supplying fuel and air to the interior of said heat exchanger, and means for causing rapidly repetitive ignitions of said fuel within the interior of said heat exchanger.

Preferably, the fuel comprises gas.

In a heat exchanger of the invention, the gas burns or explodes in pulses within the heat exchanger. This mode of combustion ensures that the conditions within the heat exchanger are highly turbulent, thereby avoiding formation of boundary layers adjacent to the surface of the heat exchanger and thus very efficient heat exchange occurs. With the high efficiency of heat exchange, the heat exchanger may be comparatively small and thus the size of the overall water heater can be made correspondingly small.

The invention also provides a method of controlling an instantaneous hot water heater having a heat exchanger and a fuel burner comprising the steps of maintaining the temperature of the heat exchanger at a first predetermined level when there is no flow of water therethrough, sensing the temperature of the heat exchanger, and activating the fuel burner when the temperature sensed falls below a predetermined level consequent upon flow of relatively cold water into the heat exchanger.

Preferably the method includes the steps of generating a control signal related to the difference in temperatures between temperature A and temperature B, where temperature A is the temperature of the water admitted to the cold water inlet and temperature B is the temperature of the water leaving the hot water outlet or the temperature at a point in the water conduit intermediate of the cold water inlet and the hot water outlet, and controlling flow of fuel to the burner in accordance with said control signal.

Preferably, said control signal (hereinafter called the first control signal), is used for initiating flow of gas to a pilot flame and the method includes the step of generating a second control signal related to the difference in temperatures between temperatures A and temperature C where temperature C is the temperature of water leaving the hot water outlet, temperature B being sensed relatively close to said cold water inlet and controlling the main flow of fuel to the burner after ignition of said pilot flame in accordance with said second control signal.

In practice, temperature B is chosen at a point a predetermined distance along the heat exchanger from the cold water inlet, say one quarter of the total length of the heat exchanger whereby said temperature difference will be approximately the same fraction of the temperature differential of the water at the hot water outlet. By sensing the temperature B at a fraction of the distance along the heat exchanger, faster response times are available for controlling flow of gas to the burner compared to the situation where sensing takes place at the hot water outlet.

The invention will now be further described with reference to the accompanying drawings, in which:

FIG. 3 is a fragmentary view of part of the heater shown in FIG. 1;

FIG. 4 is a sectional view taken along the line 4—4;

FIG. 5 is a view taken along the line 5—5;

FIG. 6 is a cross sectional view showing part of the heat exchanger of the heater;

FIG. 7 is a sectional view taken along the line 7—7;

FIG. 8 is a sectional view taken along the line 8—8;

FIG. 9 shows one form of control circuit for use in the water heater;

Figure 1:
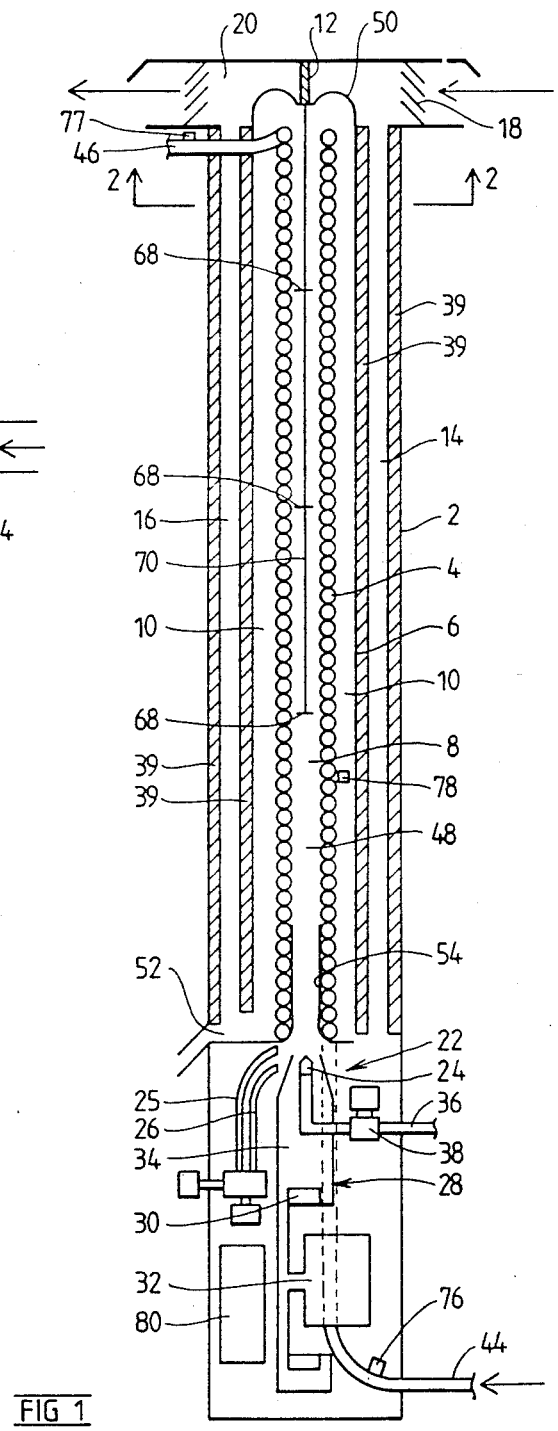
FIG. 1 is a schematic cross sectional view through an embodiment of the invention.
Figure 2:
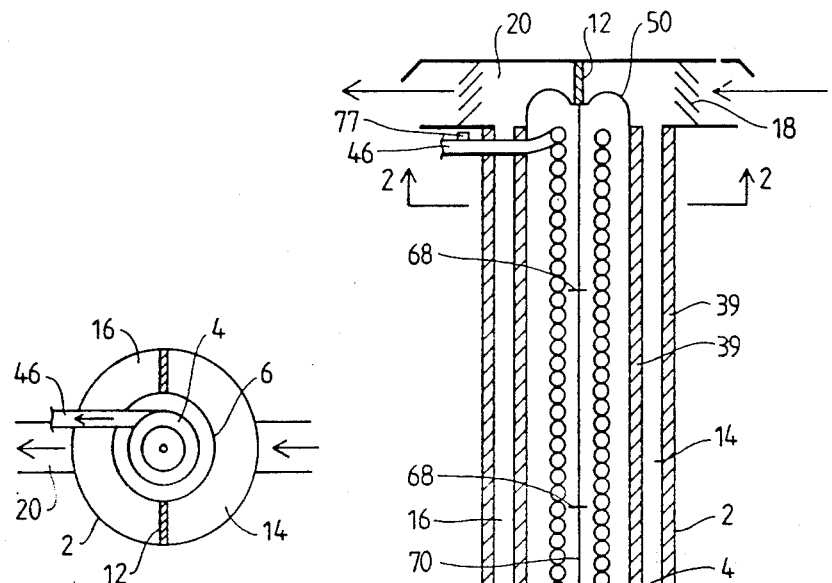
FIG. 2 is a cross sectional view taken along the line 2—2.

The water heater illustrated in FIGS. 1 to 8 comprises an outer housing 2 within which is located an elongated tubular heat exchanger 4. The heat exchanger is in turn located within a cylindrical casing 6, the exchanger 4 being spaced from the casing 6 so as to provide gas flow passages 8 and 10 through the centre of exchanger 4 and between exchanger 4 and the inner face of the casing 6. The casing 6 may be dimpled for promotion of turbulence in the spaces 8 and 10 and for spacing the casing 6 relative to the housing 2. A partition 12 is provided between the outer housing 2 and the inner casing 6 and extends the full length of the casing 6. The casing 6 is spaced from the housing 2 so as to define on one side of the partition 12 an air inlet passage 14 and, on the other side of the partition 12, an outlet passage 16 for combustion products. The housing is provided with an inlet grate 18 near its upper end and this forms the air inlet for air entering the air inlet passage 14. The housing includes a flue 20 connected to the passage 16 for expulsion of combustion products.

Located beneath the heat exchanger 4 is a fuel supply assembly 22 which includes a main gas outlet jet 24, pilot jets 25 and 26 and an air supply 28 comprising a fan 30, fan motor 32 and air outlet duct 34. The main pilot jet 25 is turned on only when water is running through the exchanger whereas the pilot jet 26 is continuously on and serves to ignite the main pilot jet 25 when required, as hereinafter explained. The main jet 24 is connected to gas pipe 36 having a solenoid valve 38 therein.

The outer surface of the casing 6 and the inner surface of the housing 2 are provided with layers 39 of insulation to prevent heat loss from the housing and to reduce the noise from the burner. During pilot operation the arrangement of the passages 8 and 10 function as a thermal trap to stop convection currents escaping to the flue 20.

The heat exchanger 4 comprises copper tubing which is coiled into an elongated tubular heat exchanger as shown in FIG. 1. As best seen in FIG. 6, the convolutions 40 of the coil are adjacent to one another and the spaces therebetween are filled by solder or brazing material 42 so as to prevent flow of gas between the convolutions 40. In a typical arrangement, the tube may comprise copper tubing of ¼ inch outer diameter and a total length of say 20 meters. The exchanger 4 would have a length of say 1.5 to 2 meters and an outer diameter from 7 to 15 cm. As seen in FIG. 1, the lower end of the heat exchanger 4 is connected to a cold water inlet pipe 44 and the upper end of the exchanger is connected to a hot water outlet pipe 46.

As explained hereinafter repetitive gas combustion takes place ina combustion chamber 48 which is located within the lower part of the heat exchanger 4. Air is drawn into the housing 2 through the grate 18, down the passage 14 and then supplied to the fan 30. The air is then directed by the duct 34 into the bottom of the exchanger together with entrained gas from the main jet 24. Combustion takes place in the chamber 48 and the hot combustion gases travel upwardly through the exchanger 4 and are then forced to turn downwardly by the curved top portions 50 of the casing 6. The combustion gases then flow downwardly to a point adjacent to the bottom of the casing 6 whereupon they will again reverse direction and travel upwardly through the passage 16 and will then be expelled through the flue 20. The bottom of the casing 6 is formed with a condensate drainage tray 52 to collect and drain away condensate from the exchanger 4. The outlet from the tray 52 may include a water trap (not shown) to help reduce noise from the burner and prevent escape of gases.

The lower part of the heat exchanger 4 and its relationship to the jet 24 and duct 34 is illustrated in more detail in FIG. 3. Located within the lower part of the exchanger 4 is venturi member 54 which has a flared opening 56, throat 58 and tapering outlet 60. The venturi 54 serves to increase the velocity of the air and gas admitted thereto from the duct and jet 24 respectively. The combination of the jet 24 and the duct 34 is arranged so that mixing of the air and gas does not take place to a significant extent prior to admission to the combination chamber 48 so that combustion does not occur at the jet 24 or within the venturi 54. To achieve this, the outlet nozzle of the duct 34 is provided with three lobes 62, 64, 66, as best seen in FIG. 5. The jet 24 is located just above the central lobe 64 and the side lobes 62 and 66 direct essentially streams of pure air into the venturi member 54 and this avoids significant mixing of the air and gas prior to expulsion from the venturi outlet 60. Once the gas and air have been expelled from the outlet 60 rapid combustion takes place within the combustion chamber. Combustion will occur spontaneously especially if the walls of the heat exchanger 4 are hot from previous combustion. Alternatively, the pilot jet 25 may be arranged to produce relatively long flames which are entrained with the air from the side lobe 62 or 66 and will initiate combustion once mixing has taken place at the outlet of the venturi member 54. Alternatively, the combustion chamber 48 may be provided with a glow plug or sparking electrodes to initiate combustion. Combustion is very rapid and can be regarded as a small explosion of the products admitted thereto. The high pressure associated therewith causes a pressure wave which forces the combustion gases upwardly along the tube 4 and simultaneously towards the outlet 60 of the venturi member. The high pressure at the outlet 60 causes a cessation of flow of gases from the jet 24 and air duct 34 through the venturi member. There may be in fact some escape of combustion gases from teh inlet 56 of the venturi member but this is unimportant. In any event, such combustion gases would be fed to the fan 30 and returned through the air duct 34. The main charge of combustion gases travelling upwardly along the heat exchanger 4 will have the effect of producing a pressure reduction at the outlet 60 of the venturi member which will then permit gas and air to flow therethrough into the combustion chamber whereupon a rapid combustion again takes place. This pulsed combustion process becomes self-sustaining. The frequency of combustion depends upon many factors including the length and diameter of the exchanger 4, the properties of the venturi member 54, the flow rates and pressures of air and gas from the duct 34 and jet 24. Typically, the frequency is of the order of 50-100 pulses per second. The repetitive explosions of gas and air in the combustion chamber 48 have the effect of substantially eliminating any boundary layers of combustion products which would tend to form against the inner surface of the heat exchanger 4, such boundary layers tending to reduce the effectiveness of the heat exchanger. Accordingly, in the heater of the invention, the heat exchange is very efficient.

In order to increase turbulence in the upper part of the heat exchanger 4, a number of baffles 68 may be suspended from a rod 70 connected to the top 50 of the casing 6. In the illustrated arrangement, the venturi member 54 is supported by means of upper and lower spiders 72 and 74 which engage the inner surface of the exchanger 4. Spiders are utilized because in the prototype tested, it has been found that the gap between the exchanger 4 and the venturi member 54 has some effect on the combustion "resonance" within the chamber 48.

In the prototype tested, the jet 24 had an orifice of 4.8 mm diameter and a flow rate of, say, 150,000 btu per hour. The fan 30 delivered air at a rate of say 2.8 cubic meters per minute at 2 to 3 inches water gauge.

In the preferred form of control for the heater, the temperature of the inlet water is sensed by a first sensor 76 coupled to the cold water inlet pipe 44. A second sensor 78 is coupled to the outer surface of the exchanger 4 at a point which is 25 percent of the total length of the exchanger from the lower end thereof. The sensors 76 and 78 lead to control circuitry 80 which broadly speaking operates as follows. The circuit 80 includes means for sensing the difference of temperature between the sensors 76 and 78 and operates to open the solenoid valve 38 and operate the fan motor 32 when the difference in temperatures is below a predetermined level so that combustion will take place and water flowing in the heat exchanger 4 will be heated. Conversely, when the temperature differential is above the predetermined level, the solenoid valve 38 is closed and the fan motor 32 is off so that combustion will not occur. Alternatively the fan may be operated continuously while water is running through the exchanger 4. This regulates the temperature rise at the point where the sensor 78 is coupled to the heat exchanger and hence this regulates the overall temperature rise in the heat exchanger 4. Thus, during operation, the supply of gas to the burner is controlled so as to produce the required temperature rise between the points where the sensors 76 and 78 are connected. When the flow of water ceases, the temperature at the sensors 78 will rise significantly so that the solenoid valve 38 will be closed and the fan motor 32 off. The heat from the pilot jet 26 may be arranged to maintain the temperature of the sensor 78 relatively high so that combustion will not occur again until there is a demand for further hot water. At this point, if cold water flows in the inlet 44, it will reach the second sensor 78 cooling it rapidly whereupon combustion will again take place and hot water will be provided. The location of the second sensor 78 part way along the length of the exchanger 4 means that only a relatively small volume of water need flow through the exchanger before the demand for hot water sensed compared with the situation where the sensor 78 was located, for instance, at the outlet pipe 46.

One form of control circuit for effecting control is shown in FIG. 9. This circuit includes input terminals 82 and 84 which are connected to a main supply, the terminals 82 and 84 being connected to a step down transformer 86, the secondary winding of which provides a 24 volt AC supply on the line 88. The circuit includes a DC power supply 90 which provides 12 and 24 volt supplies at lines 92 and 94 respectively. The sensors 76 and 78 comprise diodes which are forward biased by virtue of their coupling between the 12 volt and 24 volt supplies as shown via biasing resistors 96 and 98. The diodes are mounted in thermally conductive casings (not shown) and the inherent temperature sensitive characteristics of the diodes are relied upon to give changes of current in accordance with the temperatures to which they are subjected. Changes of current in the diodes will be reflected in changes in voltages at biasing resistors 96 and 98, these voltages being applied to positive and negative inputs of a differential amplifier 100. Output from the differential amplifier 100 is connected to one input of a comparator 102 via a variable resistor 104. The reference input to the comparator 102 is derived from a variable resistor 106 connected between the 12 volt and 24 volt supply lines, as shown. Output from the coparator 102 is connected to the gate electrode 108 of a triac 110 via a light emitting diode 112. One side of the triac 110 is connected to ground and the other is connected to the AC supply line 88 via a relay coil 114, the contacts of which control the solenoid valve 38 and the supply of power to the fan motor 32.

The circuit operates as follows. If the sensors 76 and 78 are subjected to different temperatures (for instance, as in standby operation) there will be a significant output from the differential amplifier 100 which will be equal to or comparator 102 from the variable resistor 106. Thus, the output of the comparator 102 will be low and will not cause triggering of the triac 110 or illumination of the LED112. When, however, there is no difference or little difference between the temperature of the sensors 76 and 78, the output of the differential amplifier will be zero or low and there will be an appreciable difference between that output and the reference level applied to the comparator 102. In this case, the output of comparator 102 will be high thus causing triggering of the triac 110 and illumination of the LED112. The reference level to the comparator 102 is selectable by the user by varying the variable resistor 106 so that alteration of the setting of that variable resistor effectively controls the preselected temperature differencial between the sensors 76 and 78 which thus controls the temperature rise of water through the heater. As shown in broken lines, the variable resistor 106 can be made remote from the circuit so as to provide a convenient control for the user to select the required temperature rise through the heater.

The illustrated circuit shows the output of the differential amplifier 100 connected to one input of a second comparator 118. The reference input of which is connected to the variable resistor 106 as before. Output from the comparator 118 is connected to the gate circuit 120 of a second triac 122 via an LED124. The triac 122 is connected in circuit with a second relay coil 126, the contacts of which control a solenoid valve (not shown) connected in the supply line to the main pilot jet 25. The operation of this branch of the circuit is analogous to the previously described branch and its function is to operate the main pilot jet 25 in a controlled manner relative to the main jet 24. For instance, it can be arranged to operate the main pilot jet 25 for a predetermined period, say one or two seconds prior to operating the main jet 24 so as to ensure that combustion occurs within the combustion chamber 48 when the main jet 24 is operated. Similarly, the main pilot jet 25 may be operated in accordance with the temperature sensed so that it is always operated prior to the turning on of the main jet 24.

In an alternative arrangement, the output of the differential amplifier 100 may be connected to the input of a buffer amplifier (not shown) which in turn drives a solenoid valve 38 which is of the modulating type, that is to say its flow of gas therethrough is dependent upon the voltage or current supplied to its operating coil. One suitable form of modulating valve is disclosed in International Publication No. 2085/03761. Alternatively, a current controlled bimetal modulating valve could be used. The control in such an arrangement would be analogous to that described previously. In other words, when there is a large difference in temperatures between the sensors 76 and 78 the solenoid valve will be off. As the differential falls, the solenoid valve will open at a predetermined point and its degree of opening thereafter be inversely proportional to the temperature differential and it will be fully opened when the temperatures sensed by the sensors 76 and 78 are the same.

In a further alternative arrangement, a third sensor 77 may be provided on the hot water outlet pipe 46 and its function is to take over the control of the fuel supply assembly 22 from the sensor 78 after repetitive combustion has been established in the combustion chamber 48. The sensor 77 could have the same relationship to the sensor 78 in the circuit of FIG. 9 and arranged to come into operation after a predetermined period of time after the sensor 78 has come up to temperature or alternatively when the water temperature at the sensor 77 reaches a predetermined level. This composite arrangement has the advantage that the sensor 78 being located relatively close to the inlet pipe 44 ensures a fast response and the sensor 77 at the output pipe 46 ensures positive and fast control of the temperature once repetitive combustion has been established.

The sensor 77 may also be used to sense over temperatures and, when sensed, would cut the flow of gas to the assembly 22.

Figure 10:
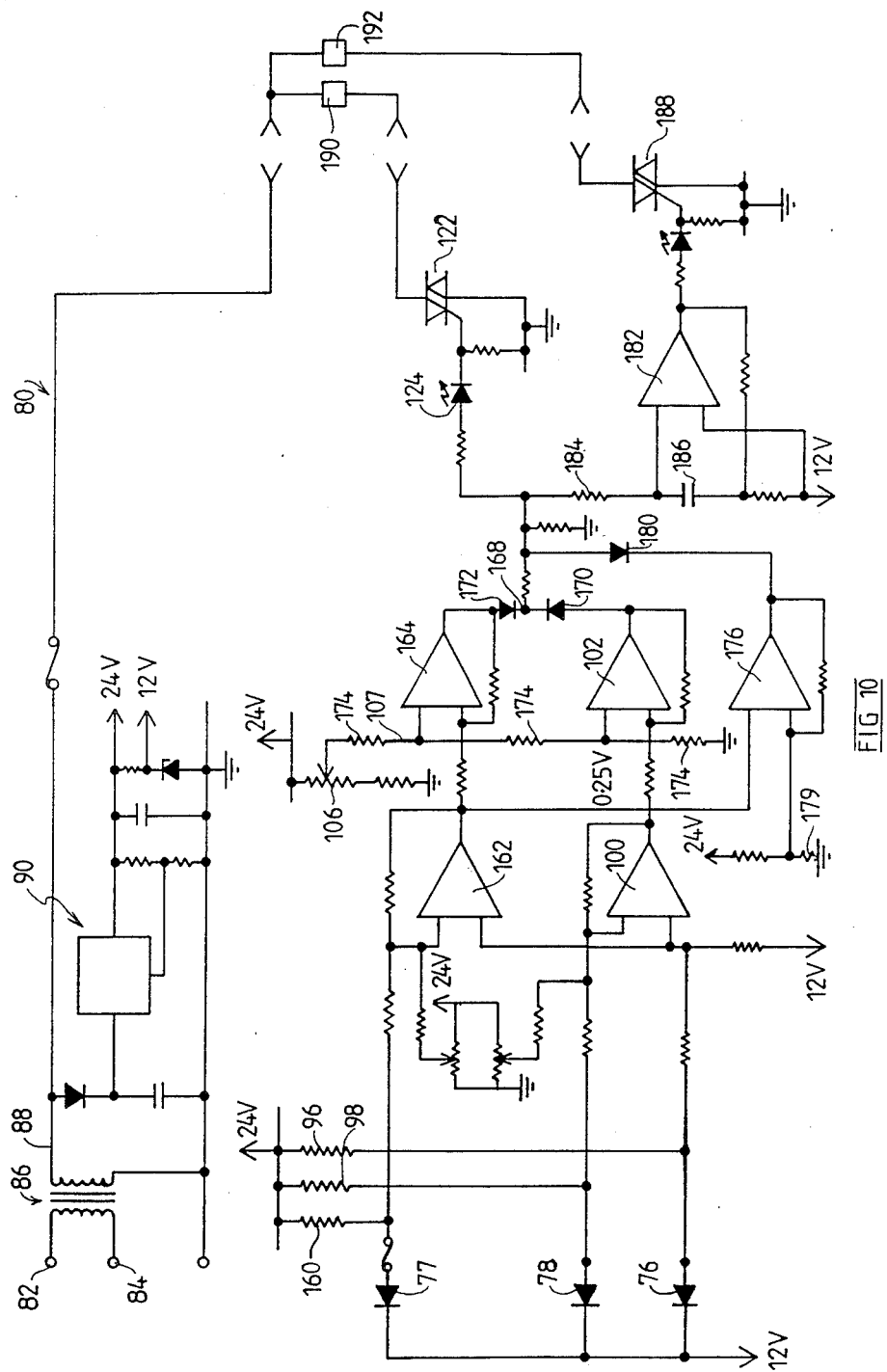
FIG. 10 shows a modified control circuit.

The circuit shown in FIG. 10 is arranged to carry out the control function when three sensors 76, 77 and 78 are utilized. In this arrangement, the differential amplifier 100 and comparator 102 operate in relation to the sensors 76 and 78 in the same manner as in the circuit of FIG. 9. The circuit however includes a third diode which comprises the sensor 77 connected between the 24 and 12 volt supplies via a biasing resistor 160. A second differential amplifier 162 is coupled to the sensors 76 and 77 and is thus responsive to changes of voltages at the resistors 96 and 160 caused by temperature variations in the diodes 76 and 77. Output from the amplifier 162 is connected to one input of a comparator 164. The other input of the comparator 164 is connected to a series branch line 107 extending from the potentiometer 106 to ground. Thus the reference levels applied to the comparators 102 and 164 from the potentiometer 106 will always be in a fixed proportion. Adjustment of the potentiometer 106 controls when the main burner is operated and hence the output temperature. Output from the comparators 102 and 164 are connected to a node 168 by diodes 170 and 172. The arrangement is such that whichever of the outputs of the comparators 102 and 164 is more positive, its diode will be forward biased and will raise the voltage at the node 168 which in turn operates the switching gate of the triac 122. The biasing resistors 174 in the reference line 107 are selected so that the voltages at the reference inputs to the comparators 102 and 164 are in the same ratio as the temperatures at the sensors 78 and 77, respectively, when the heater has been operating sufficiently to establish a generally linear temperature gradient along the length of the exchanger 4. For instance, if the sensor 78 is 25% along the length of the exchanger, the voltage reference to comparator 102 is 0.25 V, where V is the voltage reference applied to the comparator 164. In order to give the sensor 77 control when steady state operation has been achieved, a trim adjusting circuit 163 is adjusted to make the reference input to amplifier 100 less by say 1° than its corresponding value in a linear temperature gradient along the exchanger 4. This ensures that the comparator 164 is normally more positive than the comparator 102 and the sensor 77 controls combustion. The temperature gradient along the exchanger can effectively be altered by adjusting the potentiometer 106 and this produces proportionate changes to the reference inputs to the comparators 102 and 164. This adjustment, of course, controls the temperature of the water flowing from the outlet pipe 46. If the temperature increases along the exchanger departs from the predetermined linear function for instance, if the temperature of the water sensed by the sensor 78 is lower than the corresponding linear function, the differential amplifier 100 will have a significant output and on attaining a predetermined level will activate the comparator 102 thus raising the voltage of the node 168 and reverse biasing the diode 172 whereby control of the triac 122 is derived from the sensor 78. It will be appreciated that this mode of control will pertain during starting of the heater, that is to say, when cold water runs into the exchanger 4 through the inlet pipe 44.

The circuit shown in FIG. 10 includes a further comparator 176 one input of which is coupled to the output of amplifier 162, its other input having a reference level determined by resistors 178 and 179 and corresponding to a predetermined over-temperature level at which the comparator 176 will override the comparators 102 and 164 and causing the node 168 to go low whereby the triac 122 cannot be triggered. To achieve this, the output of the comparator 176 is connected via a diode 180 to the node 168.

The circuit of FIG. 10 further includes a differential amplifier 182 one input of which is coupled to the node 168 via a resistor 184 and capacitor 186 which function as a time delay. Thus, the output of the amplifier 182 will follow the level of node 168 but after a predetermined delay caused by the RC coupling. the output of the amplifier 182 is connected to the gate electrode of a triac 188. In the illustrated circuit, the triac 122 can be used to cmoplete the circuit to a relay coil 190 which controls for instance the fan and solenoid valve to the main pilot jet 25. The triac 188 controls application of power to a relay coil 192, the contacts of which control the solenoid valve 38 in the gas line to the main gas jet 24. Thus, the main jet 24 will come into operation following a predetermined period after actuation of the main pilot jet and fan.

Many modifications will be apparaent to those skilled in the art. For instance, it may be desirable to arrange for the burner assembly 28 to be located at the top of the heat exchanger 4 and burn downwardly into its interior. This would have the advantage that liquid condensate would flow along the exchanger 4 and tend to prevent build up of corrosive deposits which may occur at points at or above the dew point of the combustion gases. In this arrangement it would be necessary of course to alter the location of the sensors 76 and 78. The sensor 78 could be located on the outlet pipe 46 and the sensor 76 located 25 percent down the length of the heat exchanger 4 from the top. Alternatively, the direction of water flow could be reversed so that cold water enters at the top and hot water leaves at the bottom, the sensor 36 being again on the cold water inlet and the sensor 78 being 25% down the exchanger 4.

Figure 11:
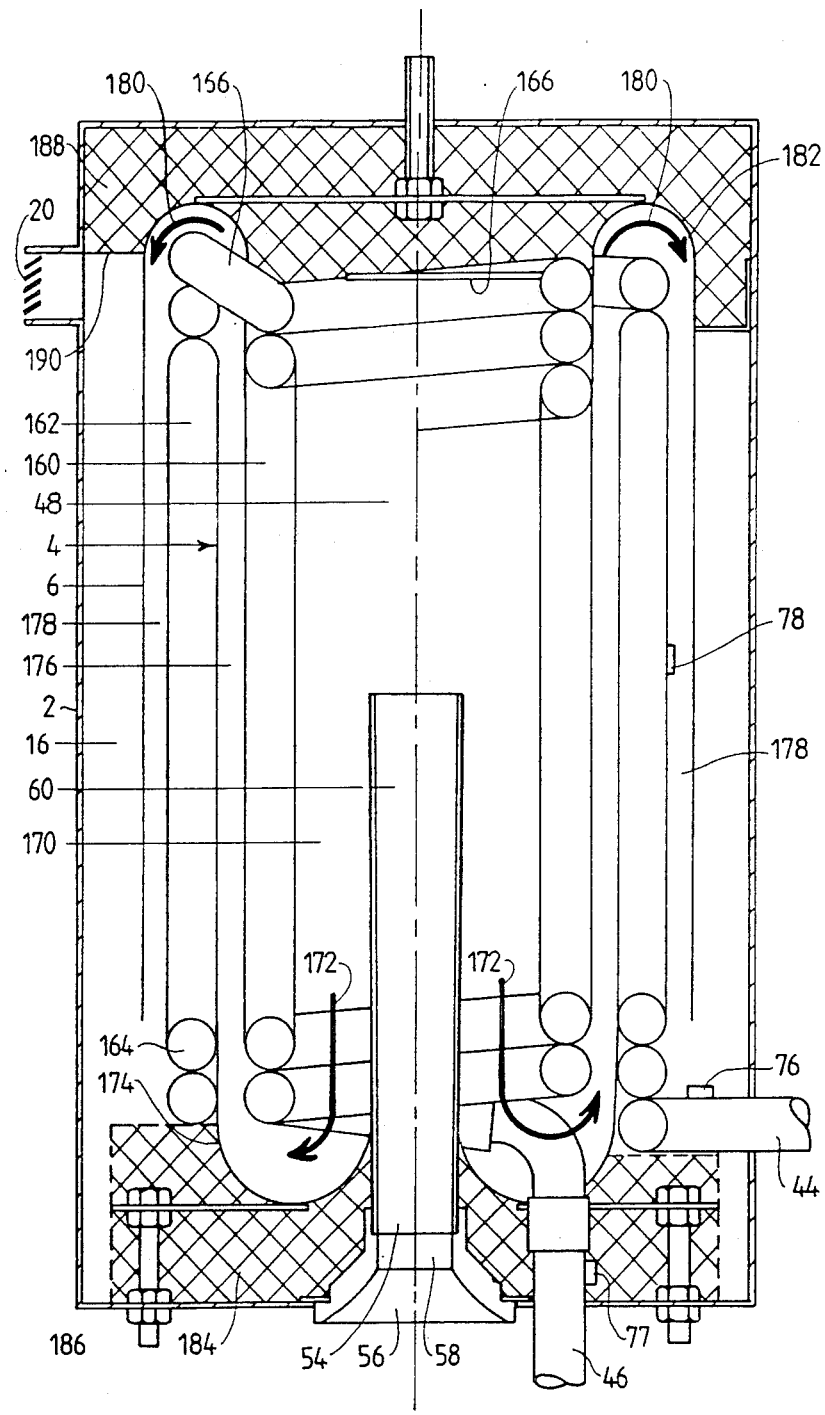
FIG. 11 shows a schematic cross-section through a preferred embodiment of the invention.

FIG. 11 shows a cross sectional view through a preferred embodiment of an instantaneous hot water heater constructed in accordance with the invention. The same reference numerals are used herein to denote parts which correspond to those described in relation to the embodiment of FIG. 1.

In the arrangement illustrated in FIG. 11, the heat exchanger 4 has an inner portion 160 located within an outer portion 162. The cold water inlet 44 is connected to the lowermost convolution 164 of the outer portion 162. A transfer portion 166 connects the top convolutions of the portions 160 and 162. A hot water outlet pipe 46 is connected to the lowermost convolution of the inner portion 160.

The heater includes the venturi member 54 which functions in the same manner as the venturi member disclosed in relation to the embodiment of FIG. 1. Gas and air are supplied to the venturi member 54 by means of a fuel supply assembly (not shown) which again can be the same as the fuel supply assembly 22 of FIGS. 3, 4 and 5. The gas and fuel supplied through the venturi member 54 will undergo rapidly repetitive combustions in the combustion chamber 48 and the expanding combustion products will impinge upon the inner portion 160 of the heat exchanger and an end plate 168 spanning the upper end of the inner potion 160 of the heat exchanger. Consequently, the only flow path of combustion products from the combustion chamber 48 is an annular gas passage 170 between the interior of the inner portion 160 and the tapering outlet 60 of the venturi member 54, as indicated by arrows 172. The heater includes an annular guide surface 174 whose inner periphery engages the tapering outlet 60 and whose outer periphery engages the inner side of the outer portion 162 of the heat exchanger. The guide surface 174 assists in directing combustion products from the passage 170 into the annular passage 176 between the heat exchanger portions 160 and 162. The combustion products then flow up the annular passage 176 and transfer heat to the heat exchanger portions 160 and 162 so that water flowing therein is heated. The combustion products then flow into a further annular passage 178 between the casing 6 and the outer face of the heat exchanger portion 162, as indicated by arrows 180. The combustion products then flow downwardly and again lose heat to the heat exchanger portion 162. The combustion products then enter the outlet passage 16 and escape through the flue 20. The heater includes annular guide surfaces 182 which assist in the transfer of combustion gases from the passage 176 to the passage 178.

In the illustrated arrangement, a layer of insulation 184 is provided at the bottom of the housing 2 and engages the lower face of the guide surface 174 to prevent heat loss in the downward direction. The layer of insulation 184 is bounded by a layer of metal foil 186 to prevent water absorption into the insulating material. Similarly the top of the casing is provided with a layer 188 of insulating material bounded by a metal foil 190. The insulating layer 188 prevents heat loss through the upper part of the casing.

In the preferred embodiment of the invention, the lengths of the heat exchanger portions 160 and 162 are about 285 mm and the inner diameters of the two portions are 62 mm and 95 mm respectively. The portions are preferably made from 20 mm outer diameter tubing and have approximately sixteen convolutions in each length. The tapered outlet 60 has a diameter of 50-60 mm at its free end and a length of about 200 mm. The width of the annular passage 178 is about 6-7 mm and its outer diameter is about 224 mm.

The method of controlling the embodiment of FIG. 11 can be the same as that described in relation to FIGS. 1 to 10. The preferred embodiment is such however that control could be effected from the thermistor 76 connected at the outlet 44, the thermistor 78 being unnecessary.

Figure 12:
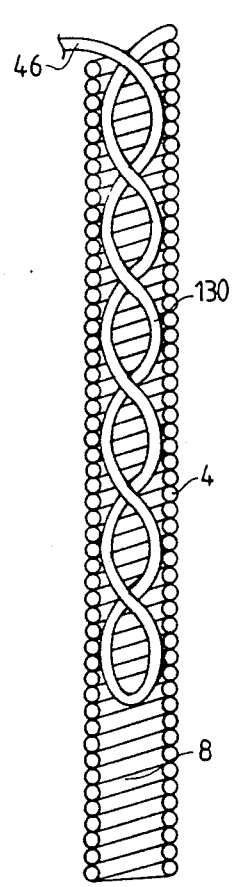
FIGS. 12, 13 and 14 show modifications of the configuration of the heat exchanger which forms part of the water heater.

FIG. 12 illustrates schematically an alternative arrangement for inducing turbulent flow within the exchanger 4. In this arrangement, the rod and baffles 70 and 68 are replaced by a spiral portion 130 of the tube making up the exchanger 4 extending from the top of the exchanger into the interior for a substantial proportion of its length and then forming the outlet pipe 46. Alternatively, the baffles could be retained.

Figure 13:
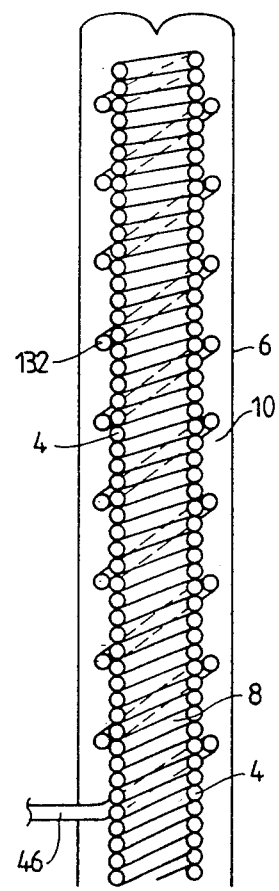

FIG. 13 shows an alternative arrangement in which a portion of the tube 132 spirals on the outside of the tube and serves to promote turbulence in the passage 10 between the exchanger 4 and the casing 6.

Figure 14:
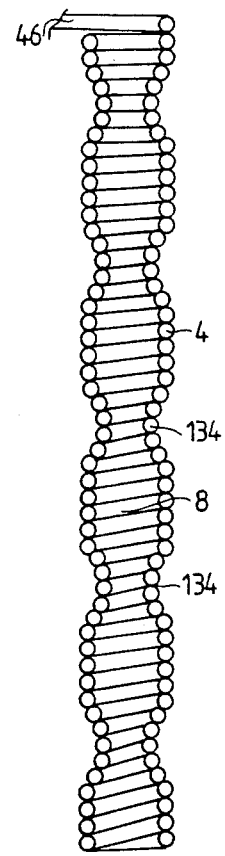

A further alternative arrangement is shown in FIG. 14 in which case the exchanger 4 is not of constant diameter along its length but is rather formed with a number of constrictions 134 which again serve to promote turbulence within the exchanger 4 and also in the passage 10.

Figure 15:
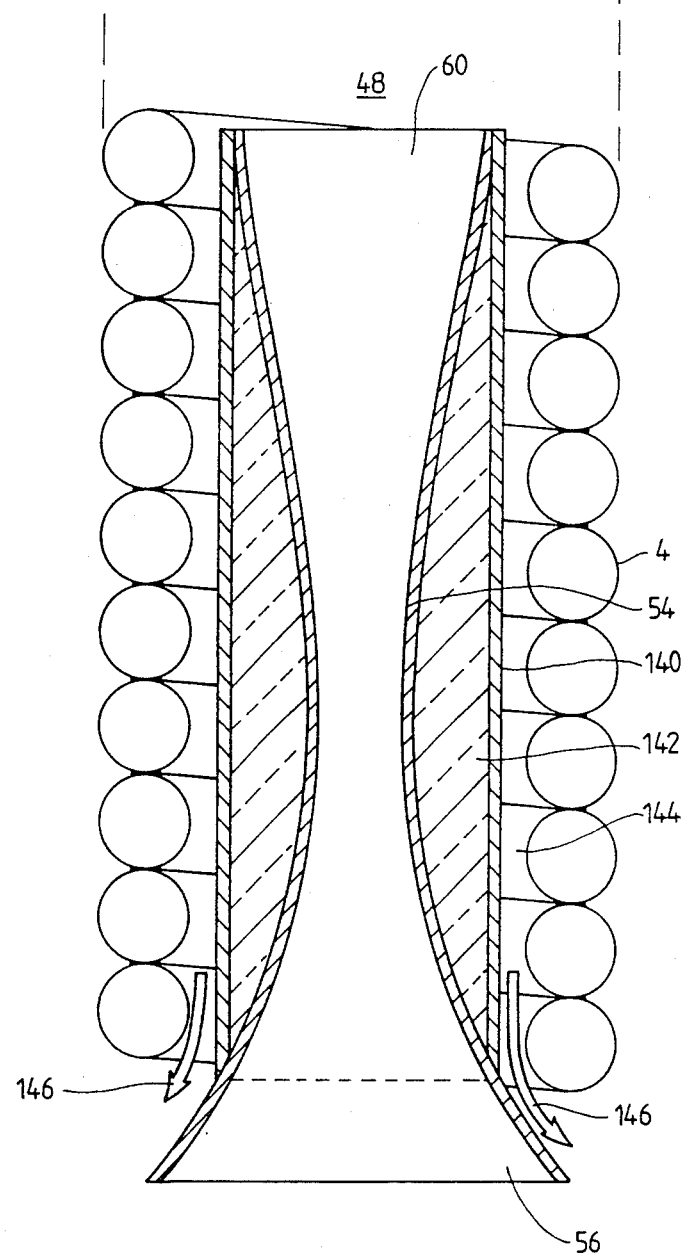
FIG. 15 is an enlarged fragmentary view of an alternative embodiment of the invention.

FIG. 15 shows a further modification of the invention. In this arrangement, the venturi member 54 is surrounded by a cylindrical sleeve 140, the top of which joins with the tapering outlet 60 of venturi member and the bottom of which joins with the flared opening 56. The space between the cylinder 160 and the venturi member 54 is filled with insulating material 142. A space 144 is left between the cylinder 140 and the inner wall of the exchanger 4 and it has been found that the space 144 has some bearing on the pulsating combustion within the chamber 146 and on the efficiency of operation of the heater. It is thought that a proportion of the gases burnt in the combustion chamber pass downwardly through the space 144 as indicated by arrows 146. The hot gases in this space heat the water flowing within the lower parts of the coil. Further, the gases flowing in the space 144 favourably affect the "resonance" of gases within the combustion chamber 48 and assist in establishing reliable repetitive combustion in the combustion chamber. The downward streams 146 of combustion products will be diverted by the tray 52 and join with the gases passing down the passage 10 and then pass up the passage 16.

Figure 17:
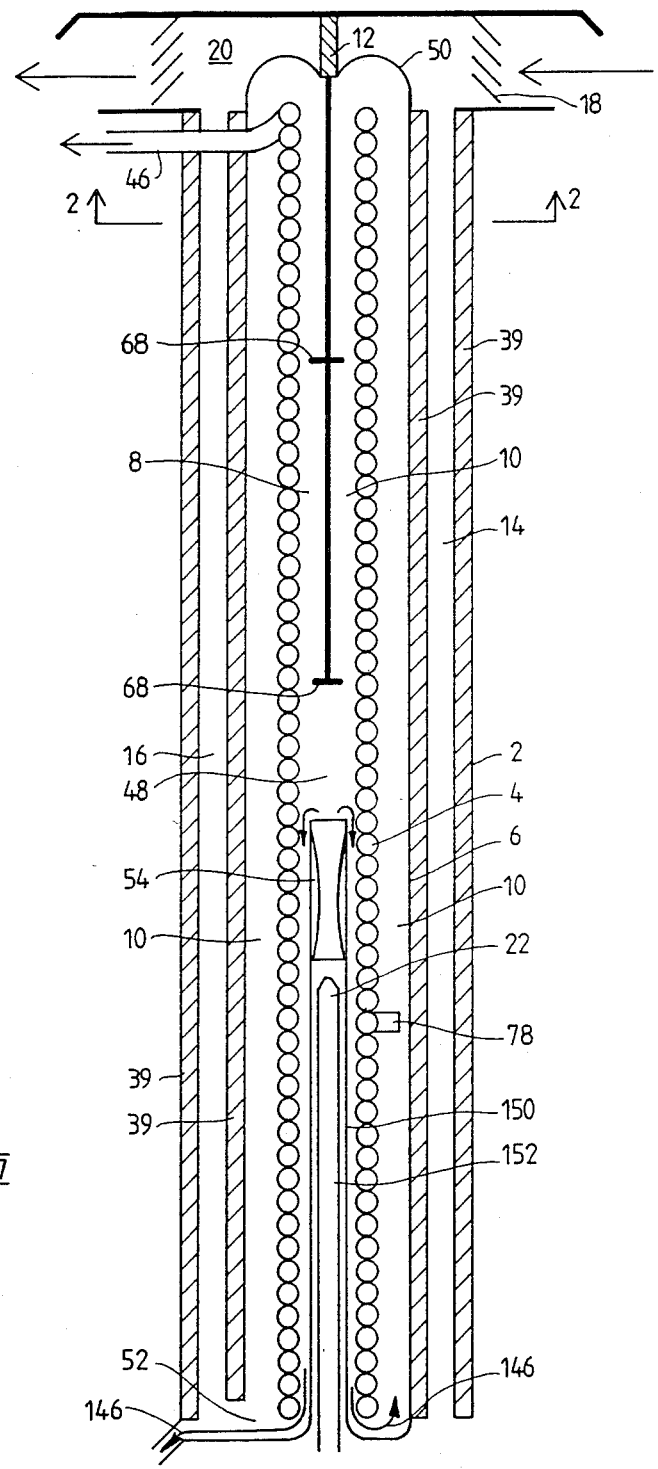
FIG. 17 is a fragmentary view of a further embodiment of the invention.

The arrangement illustrated in FIG. 17 is a further modification in which the combustion chamber 48 is located towards the centre of the exchanger 4 rather than near the lower part of the exchanger 4 as illustrated in FIG. 1. The venturi 54 is mounted in a tubular member 150, the lower end of which is connected to the tray 52. The fuel supply assembly 22 has an elongated tubular portion 152 which extends within the tubular member 150 and the main jet 24 is located just beneath the flared inlet to the venturi member 54 analogously to the arrangement shown in FIG. 3. When combustion takes place within the chamber 48 the major proportion of the combustion products flow upwardly in the space 8 and a minor proportion of the combustion products flow downwardly between the exchanger 4 and the tubular member 150 and heat exchange takes place in the region between the interior of the exchanger 4 and the tubular member 150. The downward streams 146 of combustion products are directed to flow upwards in the outlet passage 16.

Figure 18:
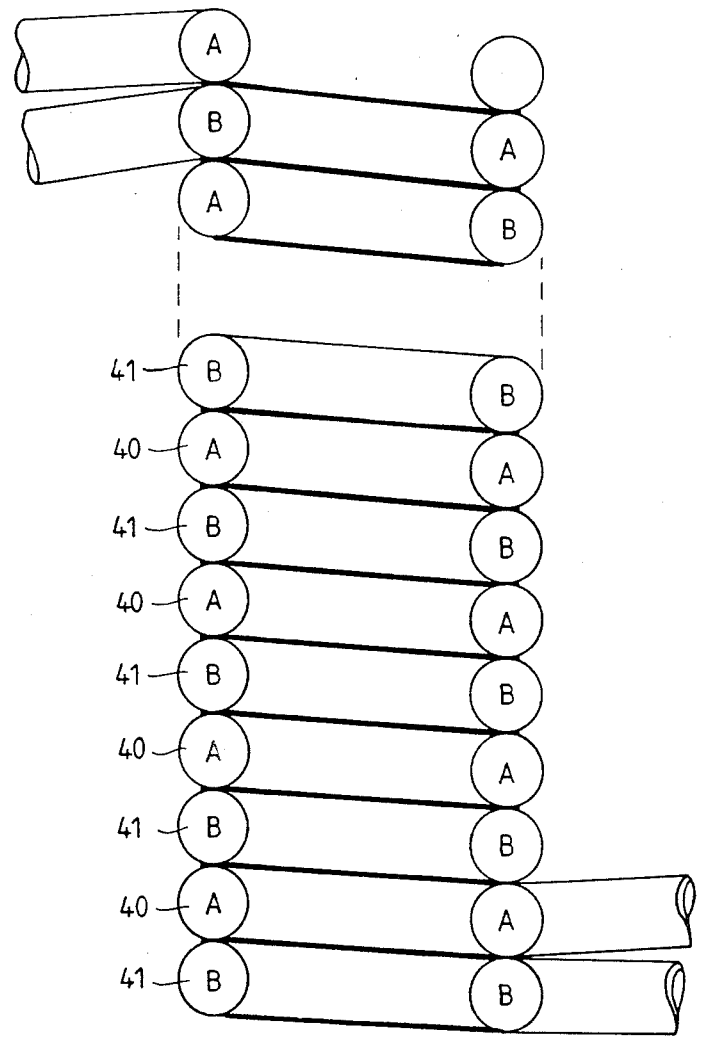
FIG. 18 is an enlarged fragmentary view of a further embodiment of the invention.

FIG. 18 illustrates a modified arrangement in which the exchanger 4 is made up from a pair of coils marked with the letters A and B having alternate convolutions 40 and 41 as shown. In this arrangement one of the coils could be used for a heating system such as a heated slab or hydronic heating system. The water for the heating system could be recirculated and thus kept in a separate circuit from the domestic hot water supply. The arrangement is such that when the burner is operating both of the coils A and B will be heated provided water is circulating though at least one of the coils so that if the other coil is brought into operation it will receive heat from the combustion of gas in the chamber as well as by conduction from the coils of the adjacent coil. This would be particularly useful in situations where the coil used in a heating system is operating and the domestic hot water service is then operated. In such a case, the water in the coils for the hot water service will already be hot and so delivery of hot water will be very rapid. By suitable switching in the control circuitry the coil for the domestic hot water service could be made to have priority over the coil for the heating. That is to say when hot water is required, flow in the coil for the heating is stopped so that the coil for the hot water supply will take substantially all of the heat from the combustion of gas as well as drawing heat by conduction from the adjacent coil.

It would be possible to burn other fuels such as oil or coal dust. In an oil fired arrangement, the gas is replaced by oil.

Many further modifications will be apparent to those skilled in the art without departing from the spirit and scope of the invention.

I claim:

1. A fuel fired water heater comprising:
   a hollow heat exchanger the interior of which comprises a combustion chamber having a non-valved inlet and a non-valved outlet;
   means for supplying fuel and air to said inlet for forming a charge of combustible fuel and air mixture in said combustion chamber during an induction cycle;
   means for initiating combustion of said charge of fuel and air mixture in said combustion chamber during a combustion cycle, the effective cross-sectional area of said non-valved outlet being large compared with the effective cross-sectional area of said non-valved inlet, such that a major portion of expanding combustion products generated after initiation of combustion in said combustion chamber will pass through said outlet, a new charge of fuel and air will flow through said inlet after combustion of said first-mentioned charge, and repetitive ignitions of successive charges will take place, and wherein the exchanger has the shape of an elongated hollow cylinder and wherein said non-valved inlet is located at the lower end of the cylinder and said means for supplying fuel and air admits said charge in an axial direction relative to said cylinder.

2. A fuel fired water heater comprising:
   a hollow heat exchanger the interior of which comprises a combustion chamber having a non-valved inlet and a non-valved outlet;
   means for supplying fuel and air to said inlet for forming a charge of combustible fuel and air mixture in said combustion chamber during an induction cycle;
   means for initiating combustion of said charge of fuel and air mixture in said combustion chamber during a combustion cycle, the effective cross-sectional area of said non-valved outlet being large compared with the effective cross-sectional area of said non-valved inlet, such that a major portion of expanding combustion products generated after intitiation of combustion in said combustion chamber will pass through said outlet, a new charge of fuel and air will flow through said inlet after combustion of said first-mentioned charge, and repetitive ignitions of successive charges will take place, and wherein the exchanger comprises a water conduit having a cold water inlet and a hot water outlet, said conduit comprising a tube which is spirally wound to form the combustion chamber.

3. A heater as claimed in claim 1 wherein the exchanger is formed with an inner portion and an outer portion, the portions being generally cylindrical in shape and wherein the inner portion is located within the outer portion and wherein combustion of the fuel takes place within the interior of the inner portion of the heat exchanger and the products of combustion are forced to pass through the annular gap between the inner and outer portions of the heat exchanger.

4. A heater as claimed in claim 3 wherein said non-valved inlet includes a venturi member for passing a charge of fuel and air into the combustion chamber during the induction cycle and after ignition of the charge of air and fuel during the combustion cycle to substantially prevent flow of combustion products therethrough.

5. A heater as claimed in claim 4 wherein said fuel supply means includes a main supply jet and a fan for supplying air to the venturi member, the arrangement being such that the air and fuel are not substantially mixed together until after discharge from the venturi member.

6. A fuel fired water heater comprising:
   a hollow heat exchanger the interior of which comprises a combustion chamber having a non-valved inlet and a non-valved outlet;
   means for supplying fuel and air to said inlet for forming a charge of combustible fuel and air mixture in said combustion chamber during an induction cycle;
   means for initiating combustion of said charge of fuel and air mixture in said combustion chamber during a combustion cycle, the effective cross-sectional area of said non-valved outlet being large compared with the effective cross-sectional area of said non-valved inlet, such that a major portion of expanding combustion products generated after initiation of combustion in said combustion chamber will pass through said outlet, a new charge of fuel and air will flow through said inlet after combustion of said first-mentioned charge, and repetitive ignitions of successive charges will take place; and
   a water conduit having a cold water inlet and a hot water outlet, said conduit comprising a tube which is spirally wound to form the heat exchanger, the exchanger being formed with an inner portion and an outer portion, the portions being generally cylindrical in shape and the inner portion being located within the outer portion, wherein combustion of the fuel takes place within the interior of the inner potion of the heat exchanger and the products of combustion are forced to pass through the annular gap between the inner and outer portions of the heat exchanger, wherein said non-valved inlet includes a venturi member for passing a charge of fuel and air into the combustion chamber during the induction cycle and after ignition of the charge of air aand fuel during the combustion cycle to substantially prevent flow of combustion products therethrough, and wherein said fuel supply means includes a main supply jet, a fan for supplying air to the venturi member, the arrangement being such that the air and fuel are not substantially mixed together until after discharge from the venturi member, and a pilot jet for igniting the charge of fuel and air within the interior of the inner portion of the heat exchanger.

7. A heater as claimed in claim 6 wherein the pilot jet operates to maintain the temperature of a part of the exchanger above a predetermined level.

8. A fuel fired water heater comprising:
   a hollow heat exchanger the interior of which comprises a combustion chamber having a non-valved inlet and a non-valved outlet;
   means for supplying fuel and air to said inlet for forming a charge of combustible fuel and air mixture in said combustion chamber during an induction cycle;

means for initiating combustion of said charge of fuel and air mixture in said combustion chamber during a combustion cycle, the effective cross-sectional area of said non-valved outlet being large compared with the effective cross-sectional area of said non-valved inlet, such that a major portion of expanding combustion products generated after initiation of combustion in said combustion chamber will pass through said outlet, a new charge of fuel and air will flow through said inlet after combustion of said first-mentioned charge, and repetitive ignitions of successive charges will take place, the heater further comprising temperature control means having an on/off valve, a first temperature sensitive element in thermal communication with the conduit at or near the cold water inlet and a second temperature sensitive element in thermal communication with the conduit at or near the hot water outlet or intermediate of the inlet and outlet, means for comparing the outputs of said elements coupled to said on/off valve such that if the temperature difference between the second element and the first element is less than a predetermined value said on/off valve is opened and the fuel supply means supplies fuel and air for combustion, but if the difference is greater than said predetermined value said on/off valve is closed and the fuel supply means does not supply fuel and air for combustion.

9. A heater as claimed in claim 8 including a pilot jet which maintains the second temperature sensitive element at a relatively high temperature when no water is flowing through the conduit so that the temperature difference between the second and the first temperature sensitive elements is above said value when no water flows through the conduit, and wherein, when cold water flows into the conduit, the temperature of the second temperature sensitive element falls and the control means establishes combustion within the heat exchanger.

10. A method of controlling an instantaneous hot water heater having a heat exchanger and a fuel burner comprising the steps of maintaining the temperature of the heat exchanger at a first predetermined level when there is not flow of water therethrough, sensing the temperature of the heat exchanger, and activating the fuel burner when the temperature sensed falls below a predetermined level consequent upon flow of relatively cold water into the heat exchanger.

11. A method of controlling an instantaneous hot water heater, having a heat exchanger and fuel burner, comprising generating a control signal related to the difference in temperature between temperature A and temperature B, where temperature A is the temperature of the water admitted to the cold water inlet and temperature B is the temperature of the water leaving the hot water outlet or the temperature at a point in the water conduit intermediate of the cold water inlet and the hot water outlet, and controlling flow of fuel to the burner to be either on or off in accordance with said control signal.

12. A method as claimed in claim 11 wherein said control signal (hereinafter called the first control signal), is used for initiating flow of gas to a pilot flame and the method includes the step of generating a second control signal related to the difference in temperatures betwen temperature A and temperature C where temperature C is the temperature of water leaving the hot water outlet, temperature B being sensed relatively close to said cold water inlet and controlling the main flow of fuel to the burner after ignition of said pilot flame in accordance with said second control signal.

13. A method as claimed in claim 12 wherein temperature B is sensed at a point a predetermined distance along the heat exchanger from the cold water inlet, say one quarter of the total length of the heat exchanger whereby said temperature difference will be approximately the same fraction of the temperature differential of the water at the cold water inlet and the temperature of the water at the hot water outlet.

14. A fuel fired water heater comprising:
a hollow heat exchanger having a water conduit which has a cold water inlet and a hot water outlet,
fuel supply means for supplying fuel and air to the interior of said exchanger and
means for causing rapidly repetitive ignitions of said fuel within the interior of the heat exchanger, said means for causing rapidly repetitive ignitions including a venturi member having its outlet open to the interior of an inner portion of the heat exchanger and being arranged to pass fuel and air into the interior of the inner portionduring an induction cycle and, after ignition of the air and fuel in a combustion cycle, to substantially prevent flow of fuel and air thereinto, said fuel supply means including a main supply jet and a fan for supplying air to the venturi member, the air and fuel not being substantially mixed until discharged from the venturi member, and wherein the exchanger has the shape of an elongated hollow cylinder and wherein said venturi is located at the lower end of the cylinder and said means for supplying fuel and air admits said charge in an axial direction relative to said cylinder.

15. A fuel fired water heater comprising:
a hollow heat exchanger having a water conduit which has a cold water inlet and a hot water outlet,
a fuel supply means for supplying fuel and air to the interior of said exchanger,
a means for causing rapidly repetitive ignitions of said fuel within the interior of the heat exchanger,
a temperature control means including an on/off valve,
a first temperature sensitive element in thermal communication with the water conduit at or near the cold water inlet,
a second temperature sensitive element in thermal communication with the water conduit at or near the hot water outlet and
a first differencing means for comparing the outputs of said elements coupled to said on/off valve such that, if the temperature difference between the second element and the first element is less than a first predetermined value, said on/off valve is open and fuel and air for combustion is supplied by the fuel supply means and, if the temperature difference is greater than said predetermined value, said on/off valve is closed and fuel and air for combustion is not supplied by the fuel supply means.

16. A fuel fired water heater comprising:
a hollow heat exchanger having a water conduit which has a cold water inlet and a hot water outlet,
a fuel supply means for supplying fuel and air to the interior of said exchanger,
a means for causing rapidly repetitive ignitions of said fuel within the interior of the heat exchanger, a temperature control means including an on/off valve, a first temperature sensitive element in thermal communication with the water conduit at or near the cold water inlet, a second temperature sensitive element in thermal communication with the water conduit intermediate of the inlet and outlet, and a first differencing means for comparing the outputs of said elements coupled to said on/off valve such that, if the temperature difference between the second element and the first element is less than a first predetermined value, said on/off valve is open and fuel and air for combustion is supplied by the fuel supply means and, if the temperature difference is greater than said predetermined value, said on/off valve is closed and fuel and air for combustion is not supplied by the fuel supply means.

17. A heater as claimed in claim 15 wherein the heater includes a third temperature sensitive element in thermal communication with the conduit intermediate of the inlet and outlet, a second differencing means for comparing the outputs of said first and third temperature sensitive elements arranged such that, if the temperature difference between the first and third elements is less than a second predetermined value, said on/off valve is open for initiating said rapidly repetitive ignitions of fuel within the interior of the heat exchanger, and said first differencing means controls said fuel supply means after said rapidly repetitive combustions have been established.

18. A heater as claimed in claim 17 wherein the output of the first differencing means is coupled to an input of a third differencing means, another input of which is coupled to a first selectable reference level, and wherein the output of the second differencing means is coupled to an input of a fourth differencing means, another input of which is coupled to a second selectable reference level and the outputs of the third and fourth differencing means are coupled to a comparator means for selecting the higher value at its inputs, the higher value being used for controlling said on/off valve.

19. A heater as claimed in claim 17 wherein the output of said second element is coupled to a fifth differencing means such that, if said output of the second element is above a third predetermined value, said on/off valve is closed and the fuel and air for combustion is not supplied by the fuel supply means.

20. A heater as claimed in claim 17 including a pilot burner and a pilot valve for controlling the supply of fuel to the pilot burner, and wherein the second differencing means is arranged to open the pilot valve for a predetermined period of time before opening said on/off valve.

21. A heater according to claim 14 wherein the conduit comprises a tube which is spirally wound to form the heat exchanger.

22. A heater according to claim 21 wherein the exchanger is formed with an inner portion and an outer portion, the portions being generally cylindrical in shape and wherein the inner portion is located within the outer portion and wherein combustion of the fuel takes place within the interior of the inner portion of the heat exchanger and the products of combustion are forced to pass through an annular gap between the inner and outer portions of the heat exchanger.

23. A heater according to claim 22 including a pilot jeet for igniting the charge of the fuel and air within the interior of the inner portion of the heat exchanger.

24. A heater according to claim 23 wherein the pilot jet operates to maintain the temperature of a part of the exchanger above a predetermined level.

25. A heater according to claim 15 wherein the conduit comprises a tube which is spirally wound to form the heat exchanger.

26. A heater according to claim 25 wherein the heat exchanger has the shape of an elongated hollow cylinder.

27. A heater according to claim 25 wherein the exchanger is formed with an inner portion and an outer portion, the portions being generally cylindrical in shape and wherein the inner portion is located within the outer portion and wherein combustion of the fuel takes place within the interior of the inner portion of the heat exchanger and the products of combustion are forced to pass through an annular gap between the inner and outer portions of the heat exchanger.

28. A heater according to claim 27 wherein said means for causing rapidly repetitive ignitions of said fuel comprises a venturi member for passing a charge of fuel and air into the combustion chamber during the induction cycle and after ignition of the charge of air and fuel during the combustion cycle to substantially prevent flow of combustion products therethrough.

29. A heater according to claim 28 wherein said fuel supply means includes a main supply jet and a fan for supplying air to the venturi member, the arrangment being such that the air and fuel are not substantially mixed together until after discharge from the venturi member.

30. A heater according to claim 29 including a pilot jet for igniting the charge of the fuel and air within the interior of the inner portion of the heat exchanger.

31. A heater according to claim 30 wherein the pilot jet operates to maintain the temperature of a part of the exchanger above a predetermined level.

32. A heater according to claim 16 wherein the conduit comprises a tube which is spirally wound to form the heat exchanger.

33. A heater according to claim 32 wherein the heat exchanger has the shape of an elongated hollow cylinder.

34. A heater according to claim 32 wherein the exchanger is formed with an inner portion and an outer portion, the portions being generally cylindrical in shape and wherein the inner portion is located within the outer portion and wherein combustion of the fuel takes place within the interior of the inner portion of the heat exchanger and the products of combustion are forced to pass through an annular gap between the inner and outer portions of the heat exchanger.

35. A heater according to claim 34 wherein said means for causing rapidly repetitive ignitions of said fuel comprises a venturi member for passing a charge of fuel and air into the combustion chamber during the induction cycle and after ignition of the charge of air and fuel during the combustion cycle to substantially prevent flow of combustion products therethrough.

36. A heater according to claim 35 wherein said fuel supply means includes a main supply jet and a fan for supplying air to the venturi member, the arrangement being such that the air and fuel are not substantially mixed together until after discharge from the venturi member.

37. A heater according to claim 36 including a pilot jet for igniting the charge of the fuel and air within the interior of the inner portion of the heat exchanger.

38. A heater according to claim 37 wherein the pilot jet operates to maintain the temperature of a part of the exchanger above a predetermined level.

* * * * *

UNITED STATES PATENT AND TRADEMARK OFFICE
CERTIFICATE OF CORRECTION

PATENT NO. : 4,750,452
DATED : 14 June 1988
INVENTOR(S) : John Massey TRIHEY

It is certified that error appears in the above-identified patent and that said Letters Patent is hereby corrected as shown below:

| Column | Line | |
|---|---|---|
| 1 | 58 | Change "hereinafater" to --hereinafter--. |
| 1 | 62 | Change "temperatures A" to --temperature A--. |
| 2 | 6 | After the first occurrence of "water" insert: --at the cold water inlet and the temperature of the water--. |
| 3 | 25 | Change "ina" to --in a--. |
| 4 | 14 | Change "teh" to --the--. |
| 5 | 48 | Change "coparator" to --comparator--. |
| 5 | 59 | After "or" insert --comparable to the reference signal applied to the--. |
| 6 | 6 | Change "differencial" to --differential--. |
| 6 | 41 | Change "No. 2085/03761" to --No. WO85/03761--. |
| 7 | 53 | Change "increases" to --increase--. |
| 8 | 12 | After "coupling." change "the" to --The--. |
| 8 | 15 | Change "cmoplete" to --complete--. |
| 8 | 65 | Change "potion" to --portion--. |

UNITED STATES PATENT AND TRADEMARK OFFICE
CERTIFICATE OF CORRECTION

PATENT NO. : 4,750,452
DATED : 14 June 1988
INVENTOR(S) : John Massey TRIHEY

Figure 16:
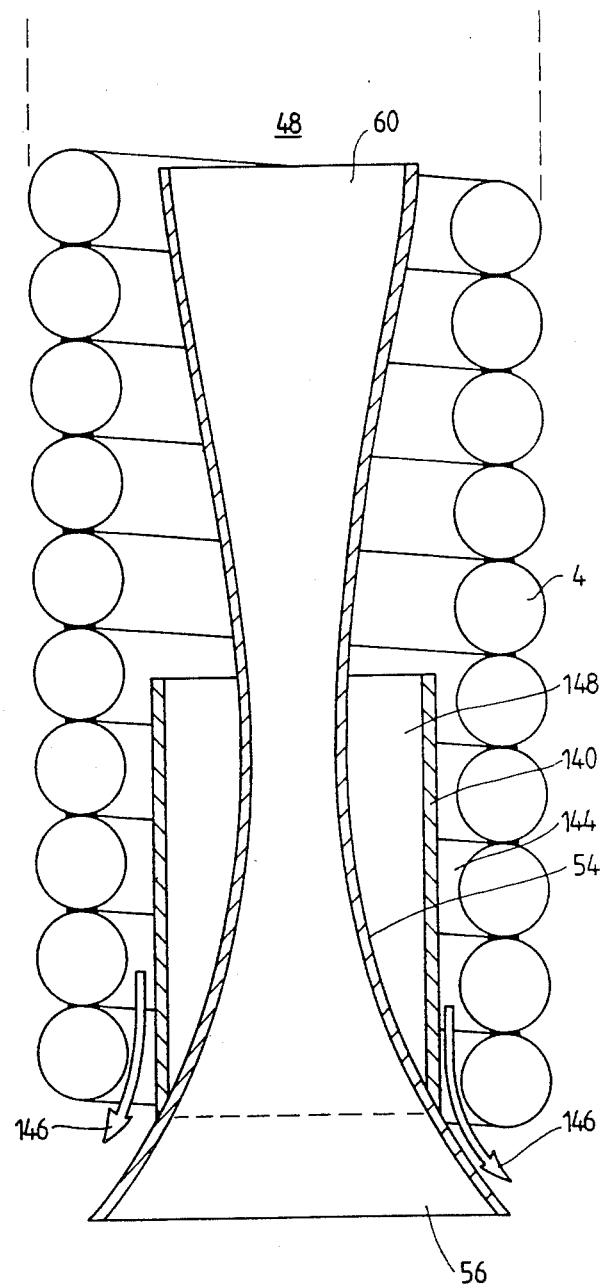
FIG. 16 is an enlarged fragmentary view of a further embodiment of the invention.

It is certified that error appears in the above-identified patent and that said Letters Patent is hereby corrected as shown below:

| Column | Line | Corrections |
|---|---|---|
| 10 | 21 | Insert the following paragraph:<br>--The arrangement illustrated in Figure 16 is analogous to the arrangement shown in Figure 13 except that the cylinder 140 is shorter and the insulation 142 is omitted, thereby leaving an open chamber 148 between the venturi member 54 and the inner surface of the cylinder 140. It has been found that the chamber 148 favourably affects the repetitive combustion of the gas within the combustion chamber 46.-- |
| 10 | 46 | After "used" insert --for domestic hot water and the other could be used--. |
| 12 | 41 | Change "potion" to --portion--. |
| 12 | 48 | Change "aand" to --and--. |
| 13 | 53 | Change "temperature" first occurrence to --temperatures--. |
| 14 | 24 | Change "portionduring" to --portion during--. |

UNITED STATES PATENT AND TRADEMARK OFFICE
CERTIFICATE OF CORRECTION

PATENT NO. : 4,750,452

DATED : 14 June 1988

INVENTOR(S) : John Massey Trihey

It is certified that error appears in the above-identified patent and that said Letters Patent is hereby corrected as shown below:

| Column | Line | |
|--------|------|---|
| 15 | 67 | Change "jeet" to --jet--. |

Signed and Sealed this

Twentieth Day of December, 1988

*Attest:*

DONALD J. QUIGG

*Attesting Officer*  *Commissioner of Patents and Trademarks*